United States Patent [19]

Spengler et al.

[11] Patent Number: 5,413,661
[45] Date of Patent: May 9, 1995

[54] METHOD FOR PRODUCING A LAMINATED STRUCTURAL COMPONENT WITH A HARD FOAM REINFORCEMENT

[75] Inventors: Gerhard Spengler, Frankfurt; Ernst Spengler, Heusenstamm by Ffm., both of Germany

[73] Assignee: R+S Stanztechnik GmbH, Offenbach, Germany

[21] Appl. No.: 118,963

[22] Filed: Sep. 9, 1993

Related U.S. Application Data

[63] Continuation-in-part of Ser. No. 883,024, May 13, 1992.

[51] Int. Cl.[6] .............................................. B32B 31/00
[52] U.S. Cl. ......................................... 156/515; 156/245;
156/307.1; 156/306.6; 156/221; 156/212;
156/214; 296/188; 100/237; 100/264; 264/46.4;
264/264; 264/45.1; 264/257; 264/258; 264/259;
264/271.1; 264/275
[58] Field of Search ................... 156/245, 307.1, 510,
156/475, 306.6, 65, 221, 212, 214, 285, 222, 228,
223; 296/188; 264/46.4, 257, 45.1, 263, 257,
258, 259, 266, 271.1, 510, 511, 275, 277, 278,
46.5, 279.1; 100/237, 264

[56] References Cited

U.S. PATENT DOCUMENTS

| | | | |
|---|---|---|---|
| 2,959,508 | 11/1960 | Graham et al. ...................... | 154/100 |
| 3,655,477 | 4/1972 | Scholl et al. ........................ | 156/202 |
| 4,065,150 | 12/1977 | Van Auken ......................... | 264/257 |
| 4,201,612 | 5/1980 | Figge et al. ......................... | 264/257 |
| 4,260,576 | 4/1981 | Pollard ............................... | 264/257 |
| 4,327,049 | 4/1982 | Miller ................................. | 264/138 |
| 4,444,818 | 4/1984 | Tominaga et al. .................. | 293/128 |
| 4,923,539 | 5/1990 | Spengler et al. . | |
| 5,073,429 | 12/1991 | Steinke et al. ...................... | 156/245 |
| 5,076,880 | 12/1991 | Spengler et al. . | |
| 5,102,163 | 4/1992 | Ishikawa ............................. | 296/188 |
| 5,238,514 | 8/1993 | Tornero .............................. | 156/245 |
| 5,258,089 | 11/1993 | Tanaka et al. ...................... | 7/14 |
| 5,260,343 | 11/1993 | Harrison et al. .................... | 521/51 |
| 5,271,886 | 12/1993 | Collom et al. ...................... | 264/50 |

FOREIGN PATENT DOCUMENTS 3722873 4/1989 Germany .
4208635 7/1992 Japan .

*Primary Examiner*—W. Gary Jones
*Assistant Examiner*—Mark De Simone
*Attorney, Agent, or Firm*—W. G. Fasse; W. F. Fasse

[57] ABSTRACT

A structural component such as a car door panel or door trim insert panel is produced in a single molding operation. For this purpose at least one premolded hard foam material block or member is inserted in a respective nesting mold cavity. Then an intermediate fiber material layer preferably in fleece form is placed on top of the foam material block. Then, a surface cover layer, such as a layer with a decorative exterior surface is placed on the intermediate fiber material layer with the decorative surface facing an upper mold section. The mold is then closed and the necessary heat and molding pressure are applied to laminate the intermediate fiber material layer to the cover layer. Then a nesting die applies additional pressure to the hard foam block for bonding the hard foam block to the intermediate fiber material layer. Depending on the selection of materials, an adhesive layer may be used between the fiber material layer and the cover layer and/or the fiber material layer and the hard foam block which serves as an impact absorbing reinforcement of the finished product.

15 Claims, 4 Drawing Sheets

METHOD FOR PRODUCING A LAMINATED STRUCTURAL COMPONENT WITH A HARD FOAM REINFORCEMENT

The present invention is a Continuation-In-Part application of copending U.S. Ser. No. 07/883,024, filed on May 13, 1992. U.S. patent application Ser. No. 07/996,901, filed Dec. 23, 1992 (Spengler), now allowed, is also related to the present application

FIELD OF THE INVENTION

The invention relates to a method for producing a laminated structural component, such as a vehicle door, with a hard foam reinforcement to strengthen the door against lateral impacts.

BACKGROUND INFORMATION

The disclosures of copending application U.S. Ser. No. 07/996,901, filed on Dec. 23, 1992, and of copending parent application No. 07/883,024, filed May 13, 1992 are incorporated herein by reference. The copending application Ser. No. 07/996,701 discloses a method and apparatus for folding a brim of a laminated panel around a panel rim to form a trim panel. The parent case No. Ser. No. 07/883,024 relates to a method and apparatus for producing trim panels. Such trim panels are to be reinforced according to the invention so that, for example, a vehicle door can better resist lateral impacts.

U.S. Pat. No. 4,923,539 (Spengler et al.), issued on May 8, 1990, and U.S. Pat. No. 5,076,880 (Spengler et al.), issued on Dec. 31, 1991, based on a Divisional Application out of the application that resulted in U.S. Pat. No. 4,923,539, disclose a method and apparatus for manufacturing trim panels, including several trim components. The apparatus for manufacturing the trim panels in a mold includes one or more nesting cavities cooperating with respective nesting dies movable in the nesting cavities which form a mold within the mold so to speak. Molds with nesting cavities and nesting dies are suitable for performing the present method.

German Patent Publication DE 3,722,873 (Loesch), published on Apr. 27, 1989, discloses a method and apparatus for producing a laminated structural component in which a carrier layer or backing is heated at least on one of its surface areas to the melting temperature of the foam material of the carrier which is then brought into contact with an intermediate layer of thermoplastic foam material which is pressed together with a cover layer so that the melting of the intermediate layer bonds the backing and the cover layer together.

The known methods and devices are suitable for the manufacture of laminated structural components such as door trim panels. However, the problem of strengthening, for example, door panels of a passenger vehicle to the extent that the door itself can absorb a substantial proportion of a lateral impact force, has not been addressed by the above discussed prior art.

Conventionally, door panels are reinforced by hard foam inserts that are manually bonded by an adhesive to a premolded panel. The term "hard foam" in this context means a foam made of small foam particles that are bonded to each other throughout the volume of the hard foam block. These hard foams are, for example, known as polypropylene particle foams.

OBJECTS OF THE INVENTION

In view of the above it is the aim of the invention to achieve the following objects singly or in combination:
 to incorporate hard foam reinforcing blocks into a structural component such as a door panel as part of the molding in which the door panel is formed, thereby avoiding the subsequent manual adhesive bonding of the reinforcing hard foam blocks to the premolded door panel;
 to secure the reinforcing hard foam blocks either by the curing action of the various layers forming the panel or by a separate adhesive bonding also inserted into the mold; and
 to manufacture panels of the type described together with their reinforcing inserts in a single molding operation.

SUMMARY OF THE INVENTION

The above objects have been achieved according to the invention by using a mold having an upper mold section and a lower mold section, the latter having at least one nesting mold cavity with a respective nesting die in the nesting mold cavity, wherein the following steps are performed:

First, a premolded hard foam member is inserted into at least one of the nesting mold cavities.

Second, an intermediate fiber material layer is placed between the upper and lower mold sections so that one side of the fiber material layer faces the premolded hard foam member.

Third, a cover layer is placed between the intermediate fiber material layer and the upper mold.

Fourth, the mold sections are heated and closed for applying a laminating and molding pressure for bonding the intermediate fiber material layer to the cover layer.

Fifth, the nesting die is pressed within the nesting cavity against the hard foam member for laminating the hard foam member to the intermediate fiber material layer, whereby the hard foam member functions as a reinforcement in the finished product which thus becomes able to absorb an impact to which the structural component may be exposed in use.

The hard foam member is a heat activatable hard foam material, preferably a premolded member having the required configurations and dimensions. The hard foam member covers at least a portion of the back surface of the laminate panel. In addition to the example of vehicle doors, various other components require such reinforcement, for example luggage racks, seat structures, and the like. According to the invention the molding, laminating, and reinforcing operations take place in a single mold in one operational sequence, whereby the temperature is sufficiently raised to cause a melting of the backing of the panel so that its subsequent curing bonds the layers to each other and to the hard foam reinforcement.

The surface cover layer is preferably selected from a group including decorative cover sheet materials, e.g. fabrics or the like, preferably bonded to a sheet of polyolefin foam, polypropylene foam, polyethylene foam, and mixtures of these foams, as well as film materials of polyolefin. The intermediate fiber material layer is preferably a fiber fleece made of fibers selected from the group of polyolefin fibers, glass fibers, polypropylene fibers, natural fibers, and mixtures of these fibers. The hard foam member is made preferably of polyolefin particles, polypropylene particles and polyethylene particles and mixtures of these particles which have been preformed into dimensionally stable foam materials provided in the form of hard foam panels, or precut blocks or premolded shapes. Thus, the hard foam member may be a thermoplastic particle foam wherein individual foam particles are bonded to each other throughout the volume of the hard foam member.

The intermediate fleece material layer is preferably made of a fiber mixture including polyolefin fibers and glass fibers, whereby the preferable content of glass fibers is within the range of about 20 to about 30 percent by volume of the fleece material, the remainder being polyolefin fibers. The glass fibers provide the fleece material with a desirable dimensional stability.

The present method can be performed at relatively low molding pressures, pressures of for example, about 28 pounds per square inch or less are suitable for the present purposes. However, the molding pressure is increased in the areas where the nesting die cavities are located by separately activating the nesting dies in these nesting cavities to pressure higher than 28 lbs./sq. in. The higher pressure may, for example be about 40 lbs/sq. in.

Depending on the material selections for the various layers, it may be preferable to also use an adhesive layer between the fiber material layer and the decorative cover layer and/or between the fiber material layer and the hard foam block. These adhesive layers may be thermoplastic materials which melt in response to the molding heat and pressure and which upon hardening provide the desired bonding. Alternatively, the adhesive layer may be an adhesive film comprising a two component prepreg that cures in the mold and bonds the surface cover layer or the hard foam member to the intermediate fiber material layer. However, separate bonding films may also be used.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
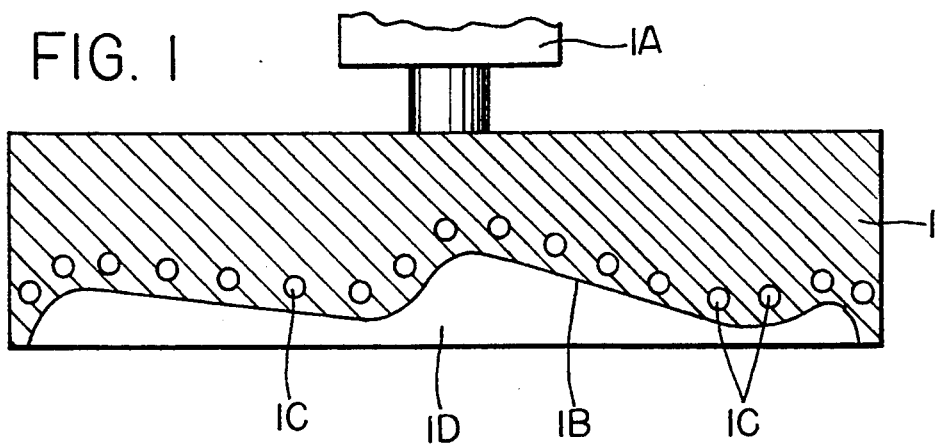
FIG. 1 is a sectional view of an upper mold section of a mold used according to the invention.
Figure 2:
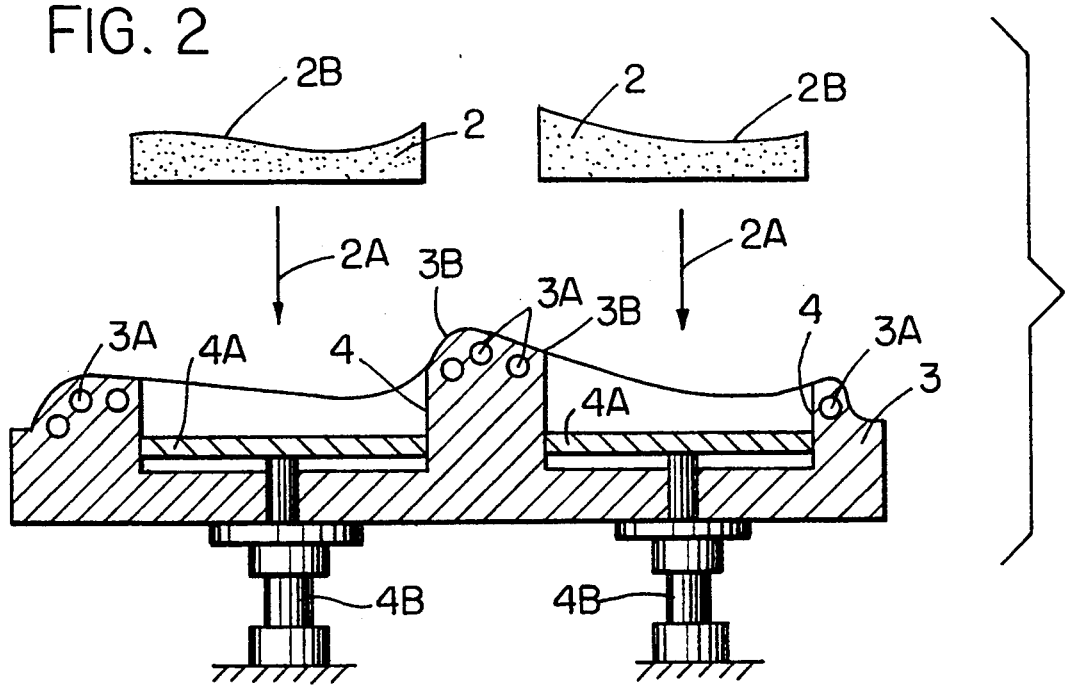
FIG. 2 shows the lower mold section in an open state relative to the upper mold section just prior to the insertion of the hard particle foam blocks into nesting cavities of the lower mold section.

FIG. 1 shows an upper mold section 1 constructed for cooperation with a lower mold section 3 shown in FIG. 2. The upper mold section is equipped with a mold drive 1A, such as a piston cylinder device and has a downwardly facing contour 1B forming the bottom of an upper mold cavity 1D. The temperature of the upper mold section 1 is controllable by flowing a coolant fluid or a heating fluid through ducts 1C. Similarly, the lower mold section 3 has ducts 3A to control the temperature of the lower mold section. The contour 3B of the lower mold section 3 matches the contour 1B of the upper mold section 1. The mold section 3 is equipped with two nesting cavities 4 each including a movable nesting die 4A driven by its respective own drive 4B, such as piston cylinder devices, whereby the nesting dies 4A can be moved inside the nesting cavities 4 independently of any closing motion of the mold sections 1 and 3. According to the invention a hard foam member 2 or rather in the shown example, two such members 2 made of particle foam as defined above are inserted into the nesting cavities 4. These members 2 are premolded or precut from materials such as thermoplastic hard foams, examples of which are mentioned above. These members 2 may be inserted manually by the operator as indicated by arrows 2A.

Figure 3:
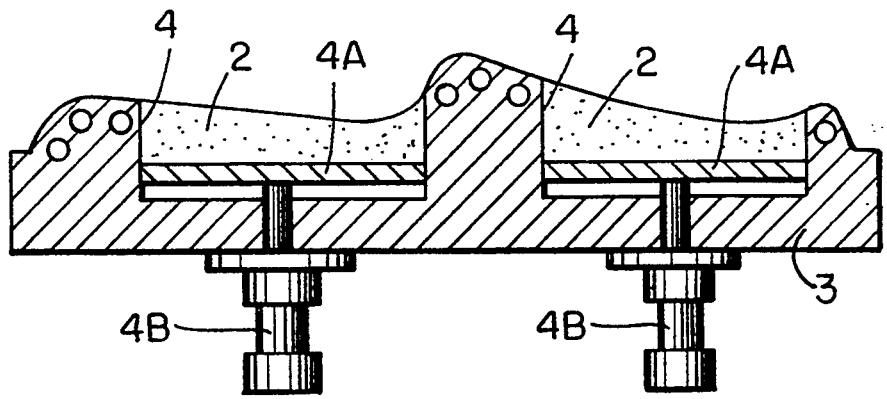
FIG. 3 shows the hard foam blocks inserted into the nesting cavities of the lower mold section.

FIG. 3 shows the lower mold section 3 with the hard foam members 2 fully inserted into the respective nesting cavities 4 and resting on the nesting dies 4A which are so adjusted in the elevational position that the upwardly facing contour 2B of the hard foam members 2 merges smoothly into the contour 3B of the lower mold section as shown in FIG. 3. Drives 4B position the dies 4A.

Figure 4:
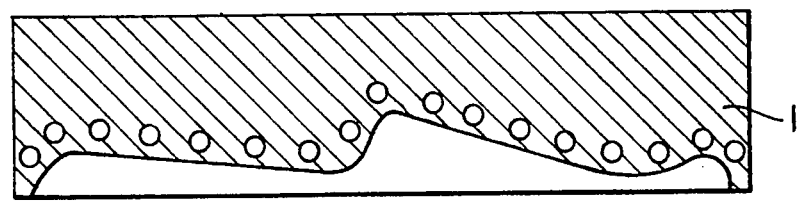
FIG. 4, 4A and 4B show the upper and lower mold sections still in the opened state with decor material and a moldable fiber fleece interposed between the two mold sections.
Figure 4A:
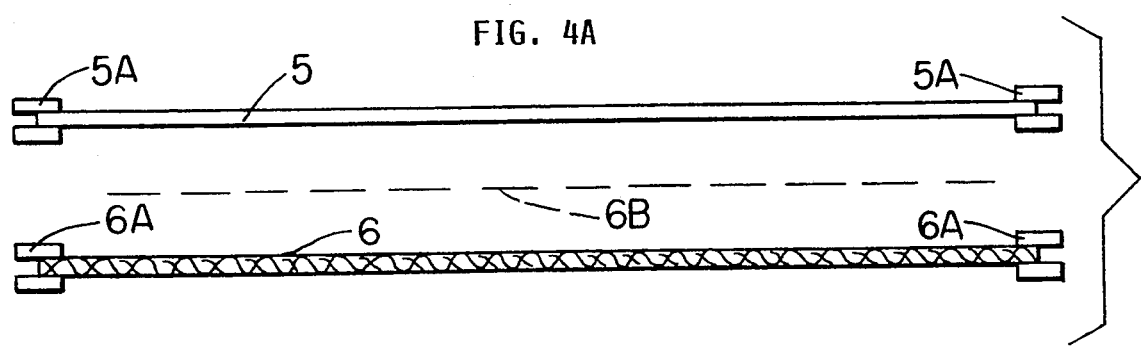
Figure 4B:
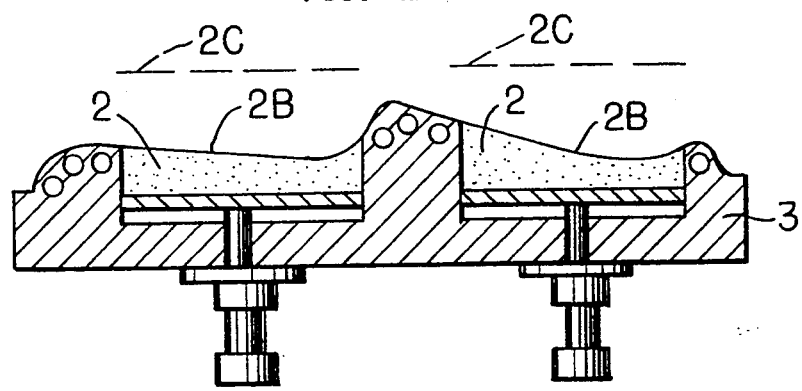

FIG. 4 shows the upper mold section 1 in its opened condition. FIG. 4B shows the lower mold section 3 in its loaded condition as in FIG. 3. FIG. 4A shows an intermediate fiber material 6 held by a tool 6A, for example in the form of a frame similar to a tentering frame, placed in a position above the lower mold section 3 as shown in FIG. 4A. A decor material 5 held by a tool 5A similar to the tool 6A is placed above the fiber material layer 6 as seen in FIG. 4A. The decor material 5 forms a cover layer that will be the outer or "good" surface of the finished product. Dashed lines 2C indicate an alternative bonding possibility by inserting adhesive films that are sufficient in size to cover at least the contour 2B of the hard foam members 2. During the molding these adhesive bonding films 2C bond the hard foam members 2 to the fiber material layer 6.

Similarly, an adhesive bonding film represented by a dashed line 6B may be inserted between the fiber layer 6 and the decor or cover layer 5 to bond the two to each other during the molding operation.

Figure 5:
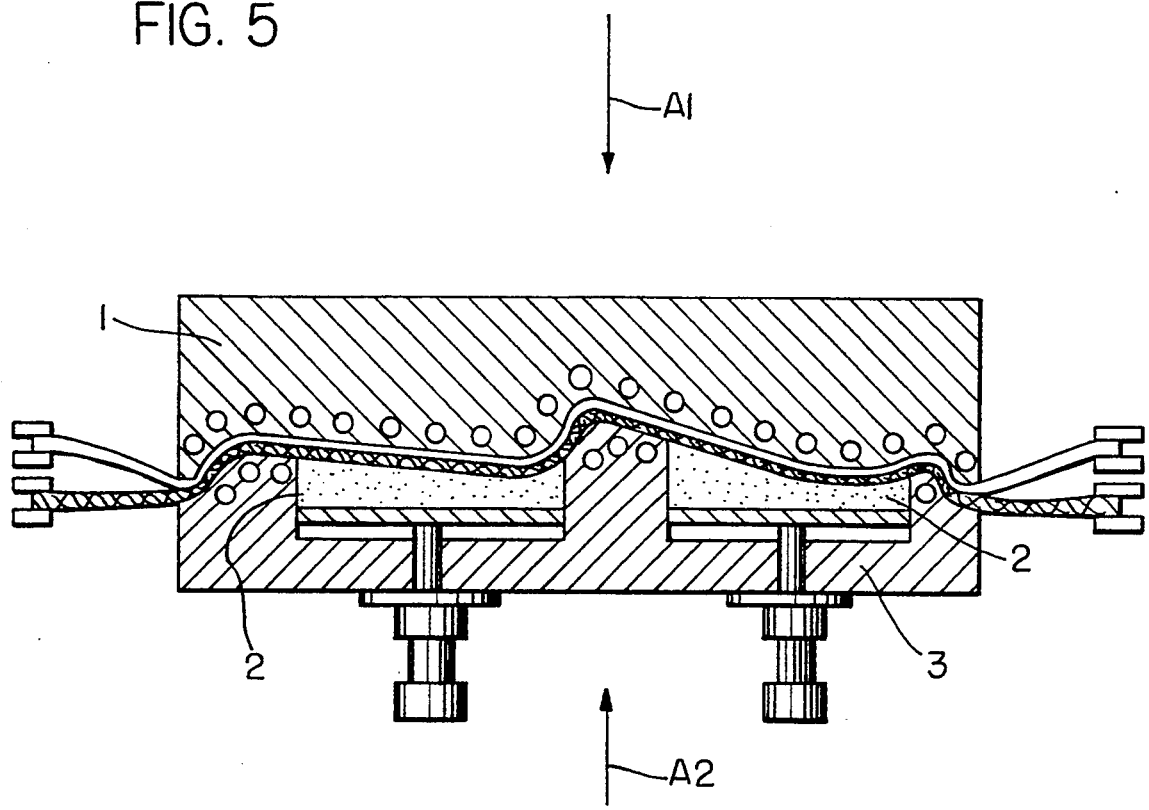
FIG. 5 illustrates the two mold sections in their closed condition prior to the application of the additional pressure by the nesting dies.

FIG. 5 shows the heating and closing of the mold sections for applying a laminating and molding pressure for bonding the intermediate fiber material layer 6 to the cover layer 5. At this time the molding pressure may, for example, be about 28 lb./sq.in. gage. The respective forces indicated by the arrows A1 and A2 are exerted by conventional drives.

Figure 6:
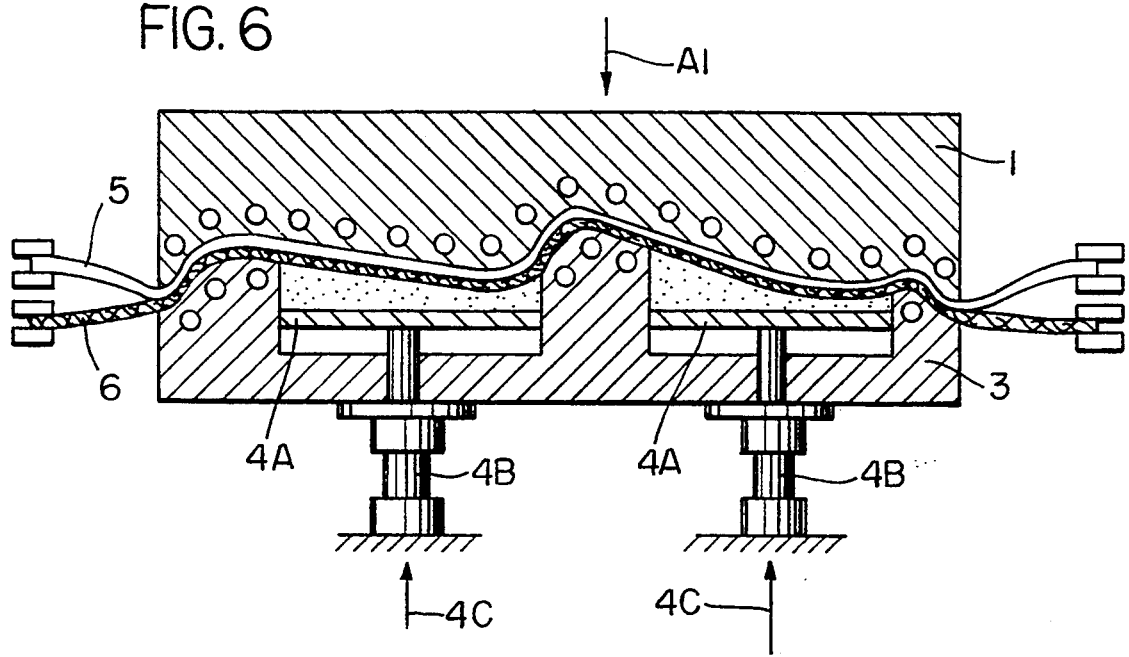
FIG. 6 is a view similar to that of FIG. 5, but showing the application of additional molding pressure by the nesting dies.

FIG. 6 shows the further molding operation in which the hard foam members 2 are pressed by the nesting dies 4A against the now closed upper mold section 1 through the fiber layer 6 and the decor layer 5. The temperatures of the mold sections are controlled as is described in more detail in the above copending applications. In the operation of FIG. 6 the hard foam members 2 are laminated or rigidly bonded to the intermediate fiber material layer, whereby the hard foam members function as an impact absorbing device in the structural component when the latter is in use, such as a car door that may be exposed to a lateral impact.

Figure 7:
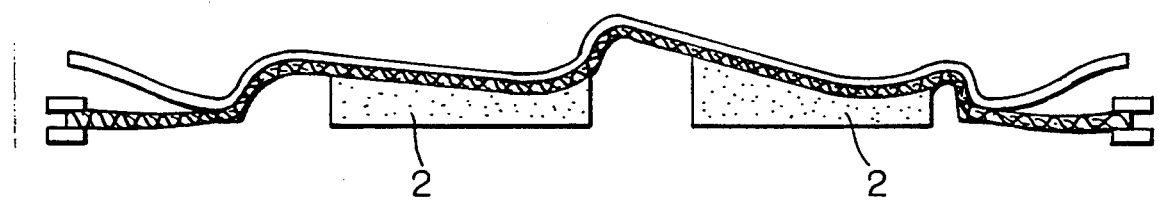
FIG. 7 illustrates the product produced according to the invention prior to an edge trimming operation.
Figure 8:
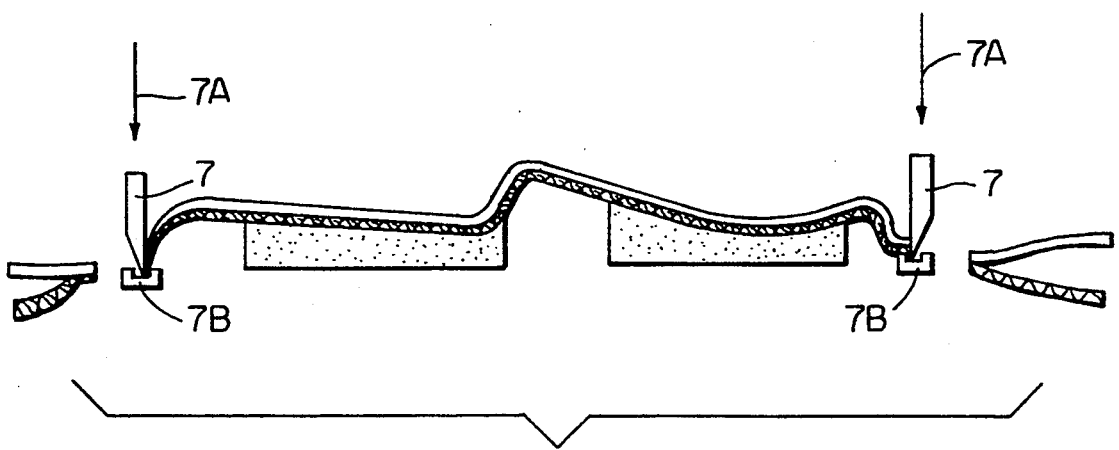
FIG. 8 illustrates one example of an edge trimming operation.

FIG. 7 shows the product after molding and bonding prior to trimming. FIG. 8 shows trimming knives 7 that cut off the edges of the finished product in response to cutting forces 7A, for example, exerted by respective piston cylinder devices as is conventional. The trimming knives 7 cooperate with counterholders 7B which are also conventional.

The temperature and pressure in and of the mold sections will be so selected that the required melting takes place at least at the interface between the foam members and the fiber fleece material. The pressure must be sufficient for the foam to intimately bond to the fibers when the heat and pressure bonding is performed as described above.

The above mentioned intermediate fiber layer is preferably a fiber fleece. However, fiber composite materials may also be used for the intended purpose, whereby it is preferred that the fibers and the matrix are of thermoplastic materials which assure the proper bonding by the present heat bonding operation.

Structural components that require a reinforcing hard foam layer may comprise a single hard foam layer contoured to the shape of the structural component and forming the back of the structural component. In all instances a single operational sequence forms the structural component so that applying the hard foam in a separate operation is avoided.

Although the invention has been described with reference to specific example embodiments it will be appreciated that it is intended to cover all modifications and equivalents within the scope of the appended claims.

What we claim is:

1. A method for producing a laminated structural component having impact protection features, in a mold having an upper mold section and a lower mold section, said lower mold section including at least one nesting mold cavity with a respective nesting die in said nesting mold cavity, said structural component including a decorative surface cover layer, an intermediate fiber material layer, and at least one hard foam member, comprising the following steps:
   (a) inserting a premolded hard foam member into said at least one nesting mold cavity,
   (b) heating said intermediate fiber material layer,
   (c) placing said intermediate fiber material layer between said upper and lower mold sections to be adjacent said lower mold section including said nesting mold cavity,
   (d) placing said cover layer between said upper and lower mold sections to be adjacent said upper mold section,
   (e) closing said mold sections and thereby laminating and molding said intermediate fiber material layer together with said cover layer, and
   (f) pressing said nesting die against said hard foam member and thereby laminating and heat bonding said hard foam member to said intermediate fiber material layer, whereby said hard foam member forms an impact absorbing element on a back side of said structural component opposite said decorative surface cover layer.

2. The method of claim 1, wherein said surface cover layer is selected from the group consisting of decorative cover sheet material heat bonded to a sheet of polyolefin foam, polypropylene foam, polyethylene foam, mixtures of these foams, and film material of polyolefin, wherein said intermediate fiber material layer is selected from the group consisting of a fleece made of polyolefin fibers, glass fibers, polypropylene fibers, natural fibers, and mixtures of said fibers, and wherein material of said hard foam member is selected from the group consisting of polyolefin particles, polypropylene particles, and polyethylene particles and mixtures of these particles formed into a dimensionally stable hard foam material.

3. The method of claim 2, wherein said intermediate fiber fleece material comprises polyolefin fibers and glass fibers, said glass fibers being present within the range of 20 to 30% by volume of said fiber fleece, said polyolefin fibers being present within the range of 80 to 70% by volume of the fleece material.

4. The method of claim 1, further comprising inserting an adhesive bonding film between said intermediate fiber material layer and an inwardly facing surface of said surface cover layer prior to closing said mold sections.

5. The method of claim 4, wherein said adhesive film is a two component prepreg that cures in said mold and bonds said surface cover layer to said intermediate fiber material layer.

6. The method of claim 1, wherein said mold closing applies a molding pressure of 28 lb./sq.in. or less.

7. The method of claim 6, wherein said nesting die increases said molding pressure in areas of said hard foam member to 40 lb./sq.in.

8. The method of claim 1, further comprising using as said hard foam member a thermoplastic particle foam wherein individual foam particles are bonded to each other throughout the volume of the hard foam member.

9. The method of claim 1, wherein said heat bonding of said hard foam member to said intermediate fiber material layer is achieved by melting an interface surface of said hard foam member due to heat of said heated intermediate fiber material layer, and without applying an additional adhesive between said hard foam member and said intermediate fiber material layer.

10. The method of claim 9, wherein said melting of said interface surface achieves an adapting of said hard foam member to a contour of said intermediate fiber material layer.

11. The method of claim 1, wherein said heating of said intermediate fiber material layer is a pre-heating before said step of closing said mold sections.

12. The method of claim 11, further comprising a step of at least partially pre-molding said intermediate fiber material layer before said step of closing said mold sections but not earlier than said pre-heating.

13. The method of claim 1, further comprising cooling at least one of said mold sections.

14. The method of claim 8, wherein said hard foam member is a particle foam member of polypropylene particles rigidly bonded together.

15. The method of claim 1, further comprising inserting an adhesive bonding film between said intermediate fiber material layer and said hard foam member.

* * * * *